(12) United States Patent
Tzeng

(10) Patent No.: US 12,556,067 B2
(45) Date of Patent: Feb. 17, 2026

(54) ROTARY ELECTROMAGNETICALLY CONTROLLED RESISTANCE DEVICE

(71) Applicant: Yuan-Kwei Tzeng, Miaoli County (TW)

(72) Inventor: Yuan-Kwei Tzeng, Miaoli County (TW)

(73) Assignee: Ho-Hsin Plastic Company Limited., Taoyuan (TW)

( * ) Notice: Subject to any disclaimer, the term of this patent is extended or adjusted under 35 U.S.C. 154(b) by 399 days.

(21) Appl. No.: 18/135,191

(22) Filed: Apr. 17, 2023

(65) Prior Publication Data

US 2024/0342536 A1    Oct. 17, 2024

(51) Int. Cl.
*H02K 11/20*     (2016.01)
*H02K 1/2786*    (2022.01)
*H02K 11/33*     (2016.01)

(52) U.S. Cl.
CPC ........... *H02K 11/20* (2016.01); *H02K 1/2786* (2013.01); *H02K 11/33* (2016.01); *A63B 2220/34* (2013.01); *A63B 2220/833* (2013.01)

(58) Field of Classification Search
CPC .. H02K 1/2786; H02K 1/2787; H02K 1/2788; H02K 1/2789; H02K 1/279; H02K 1/2791; H02K 1/27915; H02K 1/2792; H02K 11/20; H02K 11/21; H02K 11/215; H02K 11/22; H02K 11/24; H02K 11/35; H02K 11/33
See application file for complete search history.

(56) References Cited

U.S. PATENT DOCUMENTS

| 2015/0381006 A1* | 12/2015 | Allen | F04D 29/023 |
| | | | 417/423.7 |
| 2016/0218585 A1* | 7/2016 | Tzeng | H02K 7/1846 |
| 2018/0102695 A1* | 4/2018 | Lee | H02K 7/104 |

(Continued)

FOREIGN PATENT DOCUMENTS

EP        3364038 A2 *    8/2018           H02K 1/2792

OTHER PUBLICATIONS

EP-3364038-A2 translation (Year: 2018).*

*Primary Examiner* — Oluseye Iwarere
*Assistant Examiner* — Nicholas Lee Setzer
(74) *Attorney, Agent, or Firm* — Che-Yang Chen; Law Office of Michael Chen

(57) ABSTRACT

A rotary electromagnetically controlled resistance device not only installs a high-precision sensor module in the resistance device only, but also writes integrated 3-parameter actual measured data (speed, torque and current) into an EEPROM of the sensor module and installs the EEPROM in the resistance device. Software and hardware of a controller are installed externally, such that a signal cable of the sensor module can be passed through the rotary resistance device and connected to the external controller. Therefore, this invention can overcome the issue of setting the controller in the resistance device in the related art, and the resistance device can be developed independently and completely without being limited by the controller to greatly improve the flexibility in mass production and maintenance of the resistance device, while the high-precision 3-parameter real measured data can be moved and kept together with the resistance device to achieve a long-term high-precision effect.

10 Claims, 5 Drawing Sheets

(56) References Cited

U.S. PATENT DOCUMENTS

| | | | | |
|---|---|---|---|---|
| 2018/0145565 A1* | 5/2018 | Pozmantir | ............... | H02P 1/00 |
| 2019/0181728 A1* | 6/2019 | Tims | ..................... | H02K 1/27 |
| 2019/0202526 A1* | 7/2019 | Lin | ..................... | B60L 50/66 |
| 2019/0315241 A1* | 10/2019 | Lin | ..................... | H02K 21/22 |
| 2019/0319511 A1* | 10/2019 | Saito | .................. | H02K 7/116 |
| 2019/0331203 A1* | 10/2019 | Mei | ..................... | B62M 6/55 |
| 2020/0403470 A1* | 12/2020 | Tzeng | ............... | H02K 7/1861 |
| 2021/0175780 A1* | 6/2021 | Sano | ................. | H02K 3/28 |
| 2021/0367465 A1* | 11/2021 | Takahashi | ............. | H02K 3/34 |

* cited by examiner

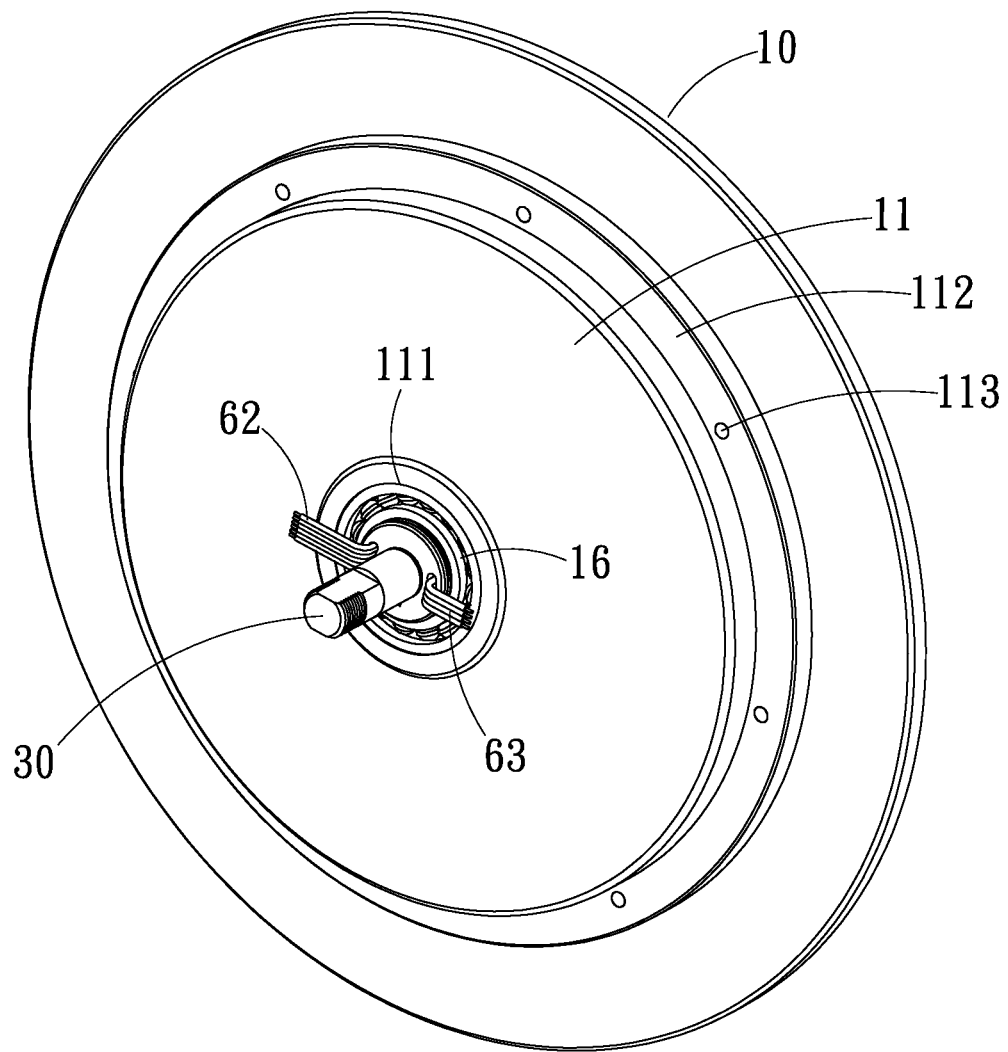
【FIG. 1】

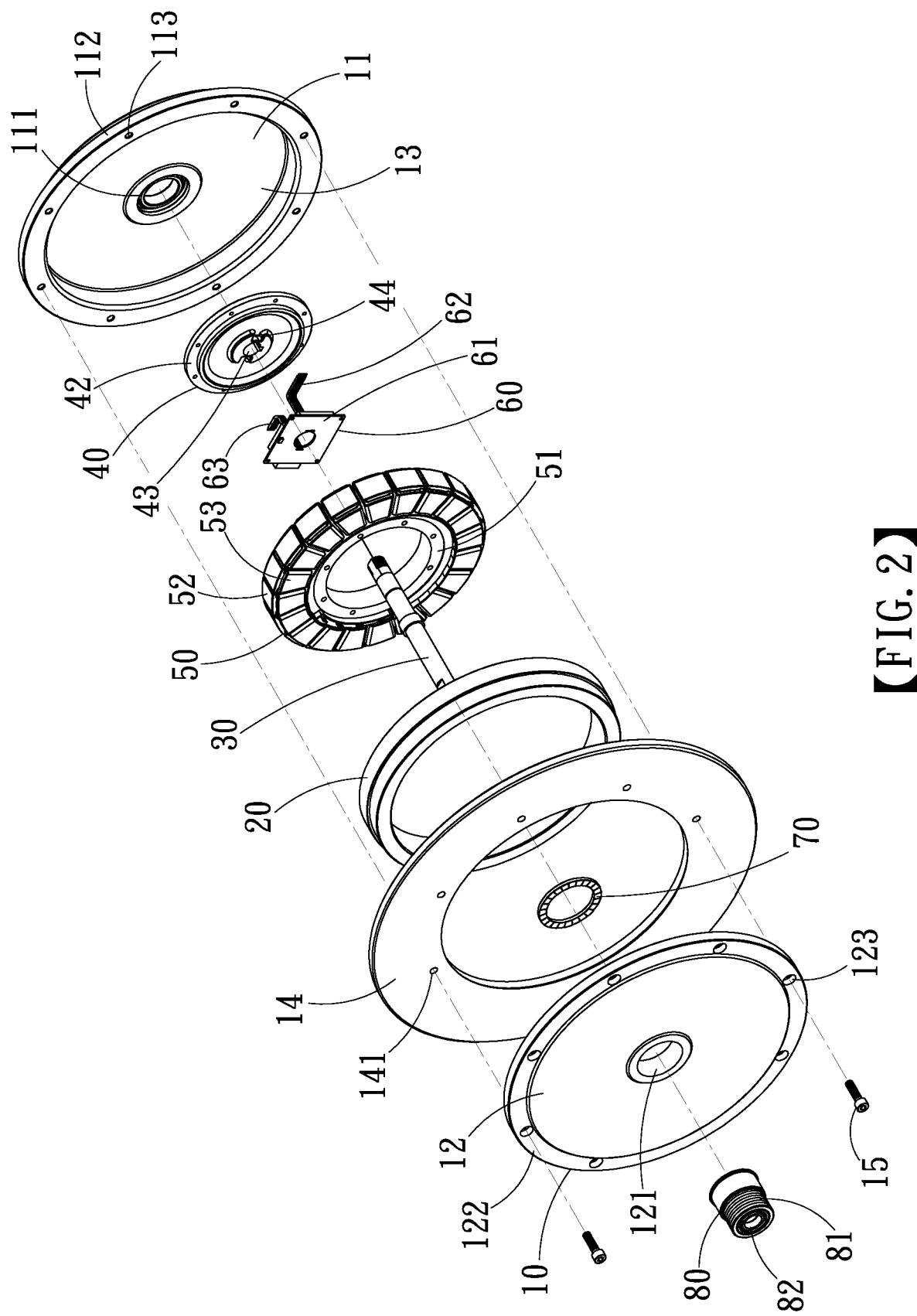
【FIG. 2】

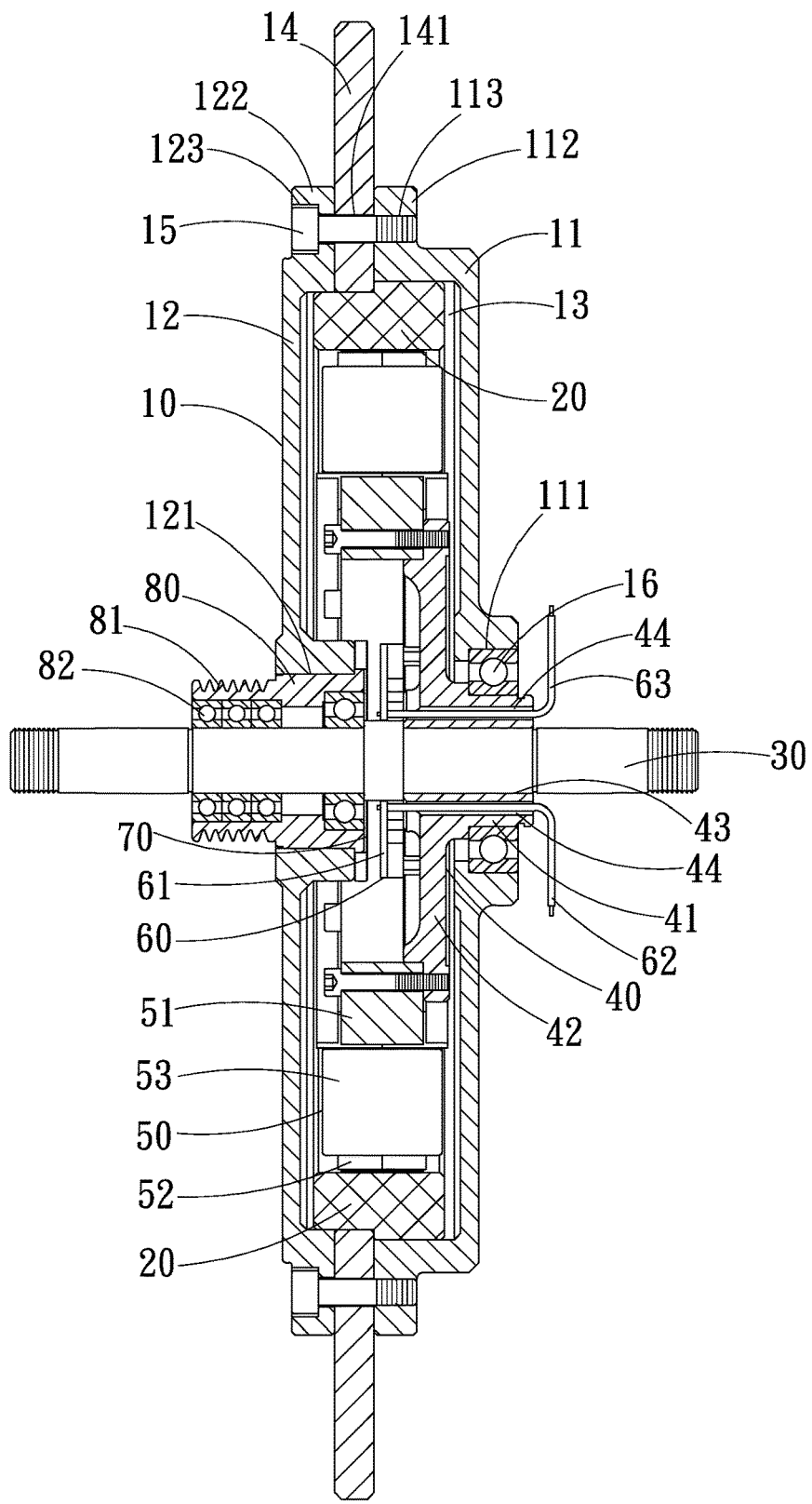
I-I
【FIG. 3】

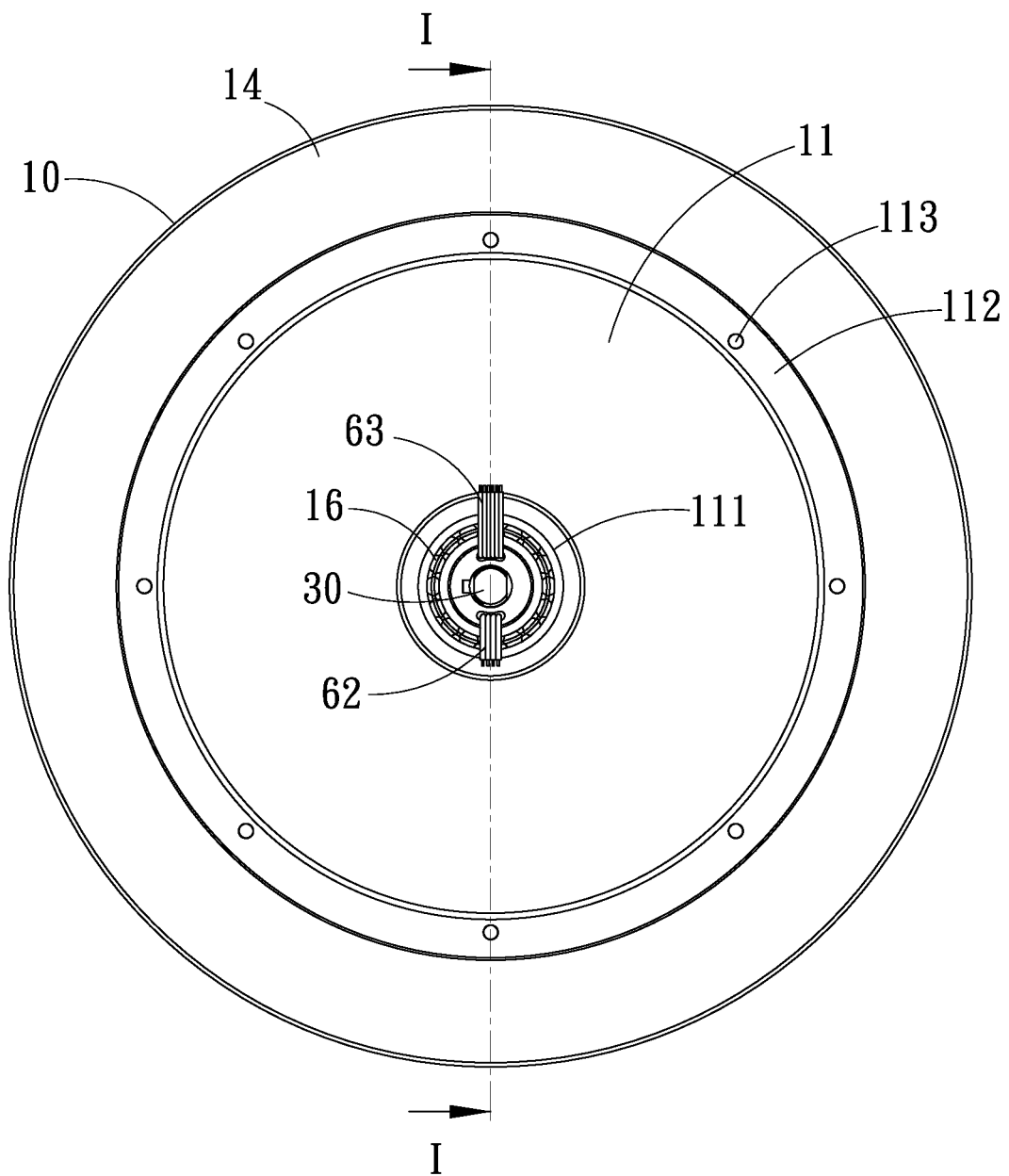
[FIG. 4]

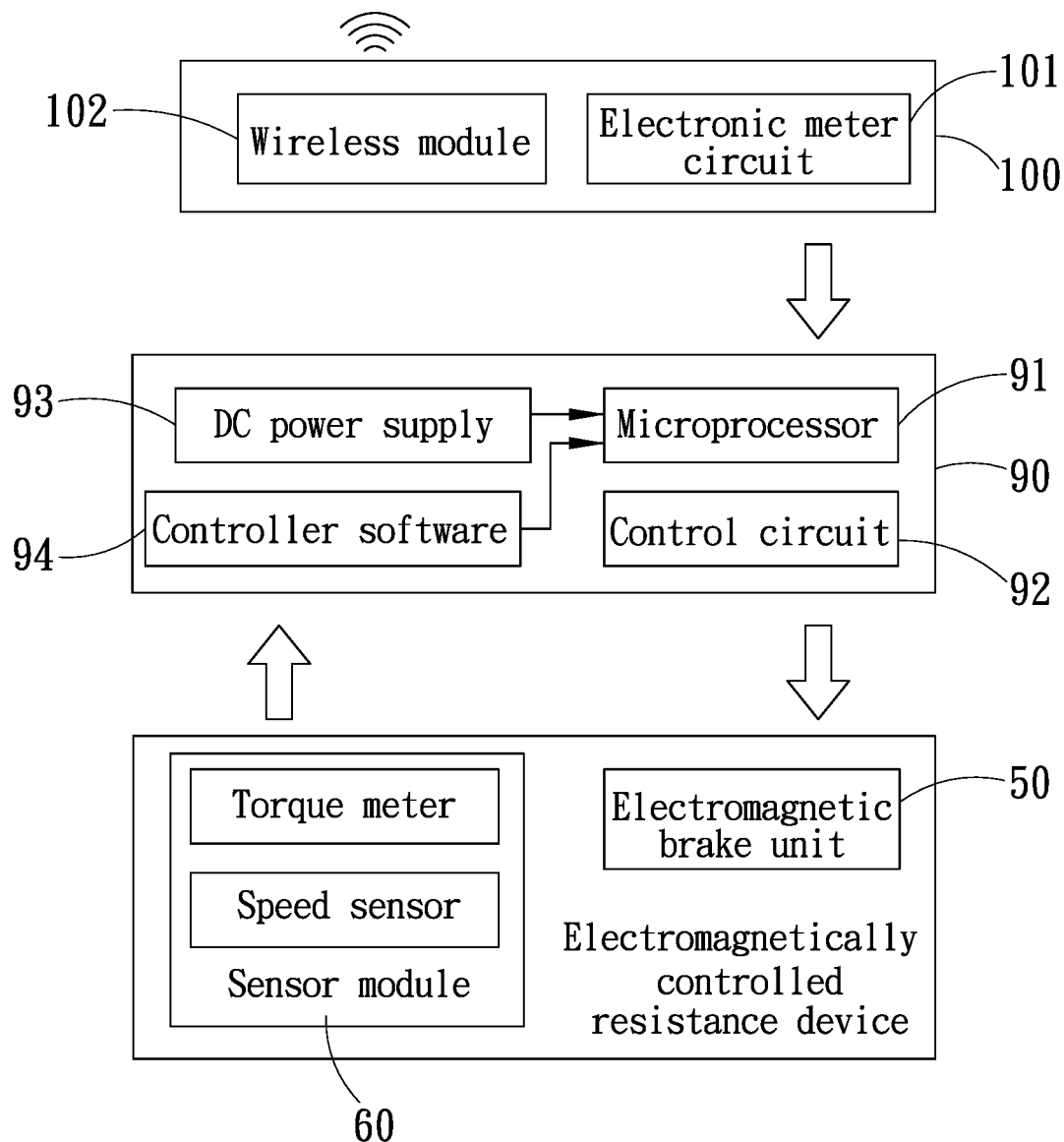
【FIG. 5】

ROTARY ELECTROMAGNETICALLY CONTROLLED RESISTANCE DEVICE

FIELD OF THE INVENTION

The present invention relates to a resistance device for fitness equipment, in particular to a rotary electromagnetically controlled resistance device.

BACKGROUND OF THE INVENTION

In fitness equipment, two parameters of workout information are important to power consumption: one is the rotating speed, and the other is the torque. Therefore, precise information of the rotating speed and the torque must be obtained to improve the precision of a resistance device. Regardless of photoelectric sensors or magnetic sensors, many speed sensors are available for obtaining the precise information of the rotating speed.

There are two common practices to obtain high-precision information of the torque in the industry. One approach is to use a sensor (such as a torque sensor) to obtain resistance information and then dynamically make an adjustment to a target torque value based on the resistance information. However, this approach requires the use of a high-precision strain gauge and the cost of such strain gauge is very high. In addition, it is necessary to calibrate the strain gauge or install the calibrated strain gauge for normal operations, and thus greatly increasing the level of difficulty and the cost for mass production.

The other approach is to provide complete torque information of the resistance device to achieve a quickly controlled and adjusted target torque value, and this approach requires the torque table installation of a single resistance device corresponding to different rotating speed, current and torque information that are loaded into a controller in order to provide accurate information. However, the torque information is no longer a single test value, but a string of massive 3-parameter actual data (such as actual measured torque, rotating speed, and current values) in order to improve precision, and there is no effective way to handle the correspondence of the massive 3-parameter actual data of such single resistance device to each fitness equipment in mass production, in addition to the need of testing the resistance device. In the industry, the controller is directly built into the resistance device and integrated into a single module. Although the 3-parameter actual data can be directly written into the memory of the controller, the life of the controller is greatly reduced due to the high temperature environment and limited internal space of the resistance device. To improve the ability of the controller to resist high temperature, the use of electronic components with high performance against thermal issue is the only solution, but it is still weak in terms of costs.

Furthermore, the resistance device of the related art uses an iron housing as its rotating body without considering its cooling effect, and it may easily cause heat accumulation and high temperature of the internal electrical and electronic components, and shorten the life of the electrical and electronic components. Moreover, if the structure of the iron housing of the related art involves a balance issue, in addition to the need for a balancing work to solve the vibration issue caused by the imbalance, the additional balance holes required for the balancing work are also unacceptable to consumers.

SUMMARY OF THE INVENTION

It is a primary objective of the present invention to provide a rotary electromagnetically controlled resistance device which can keep high-precision 3-parameter actual data in the resistance device without exposing a controller to high temperature environment. Its approach is to write the measured 3-parameter high-precision data into an Electrically Erasable Programmable Read-Only Memory (EEPROM) of a sensor module, and then build the EEPROM into the resistance device, and the software and hardware of the controller are still installed at other appropriate positions of the equipment, not only adapting to the application of the environment, but also avoiding the problem of forcing the resistance device to be combined with the controller. Therefore, the resistance device and the controller can be developed independently and completely without being limited by spaces, and thus greatly improving the flexibility in mass production, facilitating maintenance, and allowing the measured high-precision 3-parameter data to be movable and kept with the resistance device to achieve a long-term high-precision effect.

To achieve the aforementioned and other objectives, the present invention provides a rotary electromagnetically controlled resistance device, including: a rotary housing, further including a first side cover and a second side cover disposed on two sides of the rotary housing respectively, and a cavity formed between the first side cover and the second side cover; and the first side cover and the second side cover being made of a non-magnetic metal and having a shaft hole respectively formed at the center of the first side cover and the second side cover and communicating with the cavity and the outer side of the first side cover and the second side cover; a magnetic metal ring, fixed onto an inner peripheral wall of the cavity, such that the magnetic metal ring can rotate with the first side cover and the second side cover altogether; a fixed shaft, passing through the shaft holes of the first side cover and the second side cover of the rotary housing, and having two ends protruding from outer sides of the first side cover and the second side cover respectively, and provided for being installed and fixed onto the fitness equipment, such that the rotary housing and the magnetic metal ring can rotate using the fixed shaft as the center; a fixed electromagnetic brake frame, installed in the cavity of the rotary housing, and including a hub, having a shaft hole formed in the hub and non-rotatably sheathed on the fixed shaft, and an outer peripheral surface passing into the shaft hole of the first side cover, such that the first side cover rotates with the outer peripheral surface of the hub, wherein the hub is provided with one or more axially penetrating wire holes, and the wire holes are axially communicated with the cavity and the outer side of the first side cover; an electromagnetic brake unit, installed in the cavity of the rotary housing, and having an annular core, a plurality of serrated parts formed at the outer periphery of the annular core, and a plurality of coils wound around the serrated parts respectively, and the annular core of the electromagnetic brake unit being non-rotatably fixed onto the fixed shaft or the fixed electromagnetic brake frame, and a current being passed through the coils, such that the serrated parts generate an electromagnetic resistance towards an inner peripheral surface of the magnetic metal ring; and a power lead wire of the electromagnetic brake unit passing through the wire hole and extending to the outside of the rotary housing to connect a controller.

In a preferred embodiment, the rotary electromagnetically controlled resistance device further includes a sensor module installed on a side of the fixed electromagnetic brake frame in the cavity and further including an IC circuit board and a plurality of signal cable and power lead wires, and ends of the signal cable and power lead wires being connected to the IC circuit board, and the other ends of the signal cable and power lead wires passing through the wire holes and extending to the outside of the rotary housing to connect a controller.

In the rotary electromagnetically controlled resistance device of a preferred embodiment, the rotary housing includes an outer ring body made of a non-magnetic metal, and the first side cover and the second side cover are combined with two sides of the outer ring body respectively to form three components of the rotary housing which can quickly and accurately abut against the outer periphery of the magnetic metal ring, and make the overall combined structure of the rotary housing more balanced.

In the rotary electromagnetically controlled resistance device of a preferred embodiment, the first side cover and the second side cover have a flange formed at the periphery of the first side cover and the second side cover separately, and the outer ring body and the flange have a plurality of axial screw holes and a plurality of screws fixed to the screw holes respectively to achieve the effect of a quick assembly.

In the rotary electromagnetically controlled resistance device of a preferred embodiment, the first side cover, the second side cover and the outer ring body are made of an aluminum alloy or an aluminum-magnesium alloy to provide a better cooling effect of the rotary housing.

In the rotary electromagnetically controlled resistance device of a preferred embodiment, the fixed electromagnetic brake frame includes a fixed disc surrounding the periphery of the hub, and the annular core is formed in one piece or a plurality of annular cores is combined to form a side non-rotatably fixed to the fixed disc, such that the electromagnetic brake unit can be fixed to the fixed shaft.

In the rotary electromagnetically controlled resistance device of a preferred embodiment, the IC circuit board includes a sensor and a memory unit.

In the rotary electromagnetically controlled resistance device of a preferred embodiment, the memory unit is an Electrically Erasable Programmable Read-Only Memory (EEPROM) or any other memory.

The rotary electromagnetically controlled resistance device of a preferred embodiment further includes a rotating disc combined onto an inner side of the second side cover and provided for the sensor module to sense a rotating speed of the rotating disc.

In the rotary electromagnetically controlled resistance device of a preferred embodiment, the shaft hole of the first side cover is provided with a bearing and the bearing is sheathed on an outer peripheral surface of the hub.

The rotary electromagnetically controlled resistance device of a preferred embodiment further includes a transmission pulley sheathed on the fixed shaft, and an outer peripheral surface of an end of the transmission pulley is passed into the shaft hole of the second side cover, such that the transmission pulley drives the second side cover to rotate.

In the rotary electromagnetically controlled resistance device of a preferred embodiment, the outer peripheral surface of the other end of the transmission pulley is provided with a plurality of belt grooves.

In the rotary electromagnetically controlled resistance device of a preferred embodiment, the transmission pulley includes a plurality of bearings installed in the transmission pulley and sheathed on the fixed shaft.

BRIEF DESCRIPTION OF THE DRAWINGS

FIG. 1 is a perspective view of a preferred embodiment of this disclosure;

FIG. 2 is an exploded view of a preferred embodiment of this disclosure;

FIG. 3 is a cross-sectional view of Section I-I of a preferred embodiment of this disclosure;

FIG. 4 is a side view of a preferred embodiment of this disclosure; and

FIG. 5 is a schematic block diagram of a control system of this disclosure.

DESCRIPTION OF THE PREFERRED EMBODIMENTS

The aforementioned and other objects, characteristics and advantages of the present invention will become apparent with the detailed description of the preferred embodiments and the illustration of related drawings as follows.

With reference to FIGS. 1 to 4 for a rotary electromagnetically controlled resistance device of this disclosure, the rotary electromagnetically controlled resistance device includes a rotary housing 10, a magnetic metal ring 20 and a fixed shaft 30.

The rotary housing 10 includes a first side cover 11 and a second side cover 12 disposed on two sides of the rotary housing 10 respectively, and a cavity 13 formed between the first side cover 11 and the second side cover 12; the first side cover 11 and the second side cover 12 are round covers with a recession formed inside the round covers, and preferably made of a non-magnetic metal or a metal with better cooling effect such as an aluminum alloy or an aluminum-magnesium alloy, and a shaft hole 111, 121 is separately formed at the centers of the first side cover 11 and the second side cover 12 and respectively communicated with the cavity 13 and the outer sides of the first side cover 11 and the second side cover 12.

In another preferred embodiment, the rotary housing 10 is formed by three components. Besides the first side cover 11 and the second side cover 12, an outer ring body 14 may be added, such that the first side cover 11 and the second side cover 12 are clamped between two sides of the outer ring body 14. The outer ring body 14 is also a round body made of a non-magnetic metal (such as an aluminum alloy or an aluminum-magnesium alloy), and then the first side cover 11 and the second side cover 12 are combined with the two sides of the outer ring body 14 respectively. In the combined structure, a flange 112, 122 is designed at the periphery of the first side cover 11 and the second side cover 12, and the outer ring body 14 and the flange 112, 122 have a plurality of axial screw holes 141, 113, 123 respectively, so that a plurality of screws 15 can be fixed into the screw holes 141, 113, 123 quickly and precisely to abut the three components against the periphery of the magnetic metal ring 20, so as to make the overall combined structure of the rotary housing 10 more balanced, prevent vibrations caused by the unbalanced configuration, and provide an aesthetic appearance. In addition, the rotary housing 10 made of an aluminum alloy or an aluminum-magnesium alloy has the effects of facilitating heat dissipation, preventing heat from accumulating in the rotary housing 10, and extending the life of the internal electrical and electronic components.

The magnetic metal ring 20 is a round body made of a magnetic metal including but not limited to iron (Fe). The magnetic metal ring 20 is fixed to an inner peripheral wall of the cavity 13 of the rotary housing 10, such that the magnetic metal ring 20 can rotate with the rotary housing 10 altogether, and the fulcrum of rotation is situated at the fixed shaft 30. The fixed shaft 30 is passed through the shaft hole 111, 121 of the first side cover 11 and the second side cover 12 of the rotary housing 10, and two ends of the fixed shaft 30 are protruded from the outer sides of the first side cover 11 and the second side cover 12 respectively and provided for installing and fixing the two ends onto a fitness equipment such as a flywheel bike, such that the rotary housing 10 and the magnetic metal ring 20 can rotate using the fixed shaft 30 as the axis of rotation. Therefore, when a user rides on a flywheel bike and steps on the pedals, the rotary housing 10 can be driven to rotate.

In order to generate resistance during the rotation of the rotary housing 10 and allow users to control and adjust the resistance more precisely and get the required fitness training effect, this disclosure uses the electromagnetic resistance technology and installs a fixed electromagnetic brake frame 40, an electromagnetic brake unit 50, a sensor module 60 and a rotating disc 70 in the resistance device.

The fixed electromagnetic brake frame 40 is installed in the cavity 13 of the rotary housing 10 and includes a hub 41 and a fixed disc 42 surrounding the periphery of the hub 41. The hub 41 has a shaft hole 43 non-rotatably sheathed on the fixed shaft 30, and the outer peripheral surface of the hub 41 is passed into the shaft hole 111 of the first side cover 11 to drive the first side cover 11 to rotate according to the outer peripheral surface of the hub 41. The hub 41 specially includes one or more axially penetrating wire holes 44 (which are two wire holes 44 as shown in FIGS. 3 and 4). The wire hole 44 is a structure axially communicated with the cavity 13 and the outer side of the first side cover 11 and provided for connecting the internal sensor module 60 to an external controller.

The electromagnetic brake unit 50 is installed in the cavity 13 (as shown in FIGS. 2 and 3) of the rotary housing 10, and mainly includes an annular core 51 formed in one piece or a plurality of annular cores combined with each other, a plurality of serrated part 52 formed at the outer periphery of the annular core 51, and a plurality of coils 53 wound around the serrated parts 52 respectively. The annular core 51 may be integrally formed with the fixed disc 42 of the fixed electromagnetic brake frame 40, and preferably non-rotatably fixed to the fixed shaft 30 or the fixed disc 42 of the fixed electromagnetic brake frame 40, such that when a current is passed through the coils 53, the serrated parts 52 generate an electromagnetic resistance towards the inner peripheral surface of the magnetic metal ring 20, where the magnitude of the electromagnetic resistance has a positive relation with current/voltage, so that the rotational resistance of the rotary housing 10 can be controlled precisely by adjusting the current/voltage.

The sensor module 60 is installed on a side of the fixed electromagnetic brake frame 40 in the cavity 13 (as shown in FIGS. 2 and 3) and includes an IC circuit board 61 and a plurality of signal cables 62 and power lead wires 63. The IC circuit board 61 is provided with a high temperature resistant speed sensor or other sensor and a memory unit (such as Electrically Erasable Programmable Read-Only Memory (EEPROM)). One end of the signal cable 62 or the power lead wire 63 is connected to the IC circuit board 61, and the other end of the signal cable 62 or the power lead wire 63 is passed through the wire hole 44 and extended to the outside of the rotary housing 10 to connect an external controller 90 (as shown in FIG. 5). In this disclosure, the signal cable 62 or the power lead wire 63 are divided by two wire holes 44 of the fixed electromagnetic brake frame 40 and extended to the outside of the resistance device, so as to separate the high-power power lead wires 63 and the signal cable 62 from each other and avoid mutual electrical noise interference.

The rotating disc 70 is combined with the inner side of the second side cover 12, so that the rotating disc 70 and the rotary housing 10 can be linked with each other and rotated altogether to allow the sensor module 60 to sense the rotating speed data of the rotating disc 70. The sensing elements of the rotating disc 70 and the IC circuit board 61 may be implemented according to different sensing technologies. For example, if the sensing elements are optical sensors or Hall sensors, the rotating disc 70 can be other compatible components instead, which is a related art. In this way, this disclosure can achieve the effect of obtaining the sensor module 60 to move into the resistance device and the controller to transfer to outside the resistance device, so that the controller will not be affected by the high temperature inside the resistance device, which can maintain a long-term high precision effect of sensing the data of the resistance device.

In this disclosure, the sensor module 60 and the rotating disc 70 are not installed in the rotary housing 10, but the sensor module 60 is installed to another fixture (such as a bike frame) outside the rotary housing 10, and the rotating disc 70 is installed on an outer side of the rotary housing 10 to achieve the same effect of not being affected by the high temperature inside the rotary resistance device, so as to maintain a long-term high precision effect of sensing the data of the resistance device. The power lead wires of the electromagnetic brake unit 50 is still passed through the wire hole 44 and extended to the outside of the rotary housing 10 to connect a controller.

In another preferred embodiment, this disclosure further includes a bearing 16 installed in the shaft hole 111 of the first side cover 11, such that the bearing 16 is sheathed on the outer peripheral surface of the hub 41. The shaft hole 121 of the second side cover 12 is provided with a transmission pulley 80 rotatably sheathed on the fixed shaft 30, and the outer peripheral surface of an end of the transmission pulley 80 is passed into the shaft hole 121 of the second side cover 12 and the other end of the transmission pulley 80 is protruded from the second side cover 12 and has a plurality of belt grooves 81 formed at the outer peripheral surface of the transmission pulley 80, and the belt grooves 81 are linked to the pedals of a flywheel bike through a belt (not shown in the figure), so that the transmission pulley 80 can drive and rotate the second side cover 12 (including the whole rotary housing 10 and the magnetic metal ring 20). In addition, the transmission pulley 80 includes a plurality of bearings 82 installed in the transmission pulley 80 and sheathed on the fixed shaft 30 to improve the effect of rotating the transmission pulley 80 and the rotary housing 10.

With reference to FIG. 5 for the schematic block diagram of a control system of this disclosure, an external controller 90 is connected to the electromagnetic brake unit 50 and the sensor module 60 of the rotary electromagnetically controlled resistance device through the signal cables 62 and the power lead wires 63. The controller 90 includes a microprocessor 91, a control circuit 92, a DC power supply 93 and a controller software 94. The controller 90 measures the rotating speed of the rotating disc 70 by the sensor module 60 and feeds back a high-precision measured torque table including the rotating speed and current information to the controller 90, and then the controller software 94 computes and analyzes the data to obtain the excitation voltage/current required by the rotary electromagnetically controlled resistance device and output the value of the excitation voltage/current to an excitation coil of the electromagnetic brake unit 5, so as to drive the rotary housing 10 to generate the required high-precision resistance. In addition, the high-precision rotating speed and torque information are sent to an electronic meter 100 of a flywheel bike via the transmission cable or wireless transmission. The electronic meter 100 includes an electronic meter circuit 101 and a wireless module 102 for displaying the current training data and transmitting the data to a user's device through the wireless module 102.

While the invention has been described by means of specific embodiments, numerous modifications and variations could be made thereto by persons skilled in the art without departing from the scope and spirit of the invention set forth in the claims.

What is claimed is:

1. A rotary electromagnetically controlled resistance device, installed and applied to a fitness equipment, configured to be connected to an external controller, the external controller providing an excitation current and, based on received rotating speed data, obtaining, as information, a rotating speed and a torque of the rotary electromagnetically controlled resistance device, and transmitting the information to an electronic meter on the fitness equipment, the rotary electromagnetically controlled resistance device comprising:

a rotary housing, comprising a first side cover and a second side cover disposed on two sides thereof respectively, and a cavity formed between the first side cover and the second side cover; and the first side cover and the second side cover being made of a non-magnetic metal and having a shaft hole respectively formed at the center thereof, and the shaft holes respectively communicating with the cavity and outer sides of the first side cover and the second side cover;

a magnetic metal ring, fixed onto an inner peripheral wall of the cavity, such that the magnetic metal ring can rotate with the first side cover and the second side cover altogether, wherein the shaft hole of the first side cover is provided with a bearing;

a fixed shaft, passing through the shaft holes of the first side cover and the second side cover of the rotary housing, and having two ends protruding from outer sides of the first side cover and the second side cover respectively, and provided for being installed and fixed onto the fitness equipment, such that the rotary housing and the magnetic metal ring can rotate using the fixed shaft as the center;

a fixed electromagnetic brake frame, installed in the cavity of the rotary housing, and comprising a hub axially extending with a shaft hole formed on the hub and non-rotatably sheathed on the fixed shaft, and an outer peripheral surface passing into the shaft hole of the first side cover, the bearing being sheathed on the outer peripheral surface of the hub, such that the first side cover is rotatable along the outer peripheral surface of the hub through the bearing sheathed thereon, wherein the hub is provided with two axially penetrating wire holes, and the two wire holes are axially communicated with the cavity and the outer side of the first side cover, the two wire holes being arranged symmetrically with respect to the fixed shaft;

an electromagnetic brake unit, installed in the cavity of the rotary housing, and further comprising an annular core formed in one piece or a plurality of annular cores combined with each other, a plurality of serrated parts formed at an outer periphery of the annular core, and a plurality of coils wound around the serrated parts respectively, and the annular core of the electromagnetic brake unit being non-rotatably fixed onto the fixed shaft or the fixed electromagnetic brake frame, and the coils being energized by the excitation current provided from the external controller, such that the serrated parts generate an electromagnetic resistance towards an inner peripheral surface of the magnetic metal ring;

a rotating disc, combined onto an inner side of the second side cover; and a sensor module, installed on one side of the fixed electromagnetic brake frame in the cavity, the sensor module having an IC circuit board, a plurality of signal cables and a plurality of power lead wires, wherein the signal cables and the power lead wires each having two ends, first ends of the signal cables and the power lead wires being connected to the IC circuit board, second ends of the power lead wires passing through one of the two wire holes to extend to the outside of the rotary housing and being connected to the external controller, and second ends of the signal cables passing through the other of the two wire holes to extend to the outside of the rotary housing and being connected to the external controller, wherein the rotating disc enables the sensor module to sense a rotating state of the rotating disc to obtain the rotating speed data, and the sensor module transmits the rotating speed data to the external controller through the signal cables, wherein the power lead wires are used to transmit the excitation current provided by the external controller to the coils of the electromagnetic brake unit.

2. The rotary electromagnetically controlled resistance device according to claim 1, wherein the rotary housing comprises an outer ring body made of a non-magnetic metal, and the first side cover and the second side cover are combined with two sides of the outer ring body respectively.

3. The rotary electromagnetically controlled resistance device according to claim 2, wherein the first side cover and the second side cover separately comprise a flange formed thereof, and the outer ring body and the flange separately comprise a plurality of axial screw holes and a plurality of screws fixed to the screw holes respectively.

4. The rotary electromagnetically controlled resistance device according to claim 3, wherein the first side cover, the second side cover and the outer ring body is made of an aluminum alloy or an aluminum-magnesium alloy.

5. The rotary electromagnetically controlled resistance device according to claim 1, wherein the fixed electromagnetic brake frame comprises a fixed disc surrounding the circumference of the hub, and the annular core is formed in one piece or a plurality of annular cores is combined to form a side not rotatably fixed to the fixed disc.

6. The rotary electromagnetically controlled resistance device according to claim 1, wherein the IC circuit board comprises a sensor and a memory unit.

7. The rotary electromagnetically controlled resistance device according to claim 6, wherein the memory unit is an Electrically Erasable Programmable Read-Only Memory (EEPROM).

8. The rotary electromagnetically controlled resistance device according to claim 1, further comprising a transmission pulley sheathed on the fixed shaft, and an outer peripheral surface at an end of the transmission pulley passing into the shaft hole of the second side cover, such that the transmission pulley drives the second side cover to rotate.

9. The rotary electromagnetically controlled resistance device according to claim 8, wherein the transmission pulley comprises a plurality of belt grooves formed on an outer peripheral surface of the other end of the transmission pulley.

10. The rotary electromagnetically controlled resistance device according to claim 8, wherein the transmission pulley comprises a plurality of bearings installed therein and sheathed on the fixed shaft.

* * * * *